(12) United States Patent
Dilluvio

(10) Patent No.: US 7,014,247 B2
(45) Date of Patent: Mar. 21, 2006

(54) HARDTOP CONVERTIBLE

(75) Inventor: Christopher J. Dilluvio, Farmington Hills, MI (US)

(73) Assignee: ASC Incorporated, Southgate, MI (US)

( * ) Notice: Subject to any disclaimer, the term of this patent is extended or adjusted under 35 U.S.C. 154(b) by 221 days.

(21) Appl. No.: 10/378,337

(22) Filed: Mar. 3, 2003

(65) Prior Publication Data

US 2004/0174039 A1 Sep. 9, 2004

(51) Int. Cl.
*B60J 7/08* (2006.01)
*B60J 7/16* (2006.01)

(52) U.S. Cl. .............................. 296/107.17; 296/107.08; 296/107.16; 296/108

(58) Field of Classification Search ............ 296/107.01, 296/107.08, 108, 107.16, 121, 37.16, 107.17, 296/107.18, 107.09
See application file for complete search history.

(56) References Cited

U.S. PATENT DOCUMENTS

| | | |
|---|---|---|
| 404,405 A | 6/1889 | Haughey |
| 1,184,734 A | 5/1916 | Freeman |
| 1,784,279 A | 12/1930 | Ellerbeck |
| 1,988,346 A | 1/1935 | Wagner |
| 2,007,873 A | 7/1935 | Paulin |

(Continued)

FOREIGN PATENT DOCUMENTS

| | | |
|---|---|---|
| BE | 493260 | 5/1950 |
| CH | 650980 | 8/1985 |
| DE | 646381 | 5/1937 |
| DE | 1 505 474 | 7/1969 |
| DE | 3416286 A1 | 10/1984 |

(Continued)

OTHER PUBLICATIONS

Picture of a 1957 Ford Fairlane retractable hardtop convertible, The Detroit News, Apr. 6, 1994.
Viper Pure Performance by Dodge/Auto Editors of Consumer Guide, Publications International, Ltd., pp. 6 and 7, 1993.
Automotive Industries, Feb. 1990, p. 75, showing "C & C Intrigue".
Automobil Revue, Sep. 5, 1991, cover page and p. 29 (including English translation).
Car Styling 86, Jan. 1992, cover page and pp. 64–67 (including English translation).
Introducing the Chevy SSR, Aug. 2000, 2 pages (and description of corresponding public use).
Toyota MRJ / 1995 (believed to have been offered for sale, publicly used, and/or published prior to the filing date of this application).
Toyota Soarer / 2000–200x (believed to have been offered for sale, publicly used, and/or published prior to the filing date of this application).

(Continued)

*Primary Examiner*—D. Glenn Dayoan
*Assistant Examiner*—Greg Blankenship
(74) *Attorney, Agent, or Firm*—Harness, Dickey & Pierce, P.L.C.

(57) ABSTRACT

A hardtop convertible roof for a vehicle includes rigid panels that are each retractable and at least two of the panels are directly connected to fixed pivots and rotate about the fixed pivots when being retracted. One of the panels can be directly connected to a fixed pivot that is located between wheel housings on the vehicle. The rearmost roof section can be directly connected to a fixed pivot and rotate rearwardly about the fixed pivot less than about 90° when moving from the raised to stowed position. At least four roof sections can be used wherein one of the roof sections is directly connected to a fixed pivot about which it rotates when moving between the raised and stowed positions.

49 Claims, 6 Drawing Sheets

U.S. PATENT DOCUMENTS

| | | | |
|---|---|---|---|
| 2,076,243 A | 4/1937 | Marshall et al. |
| 2,303,789 A | 12/1942 | Carr |
| 2,564,446 A | 8/1951 | Parsons |
| 2,580,486 A | 1/1952 | Vigmostad |
| 2,596,355 A | 5/1952 | Ackermans |
| 2,704,225 A | 3/1955 | Anschuetz et al. |
| 2,747,928 A | 5/1956 | Olivier et al. |
| 2,768,024 A | 10/1956 | Spear, Jr. |
| 2,768,025 A | 10/1956 | Spear, Jr. et al. |
| 2,841,441 A | 7/1958 | Evans |
| 2,856,231 A | 10/1958 | Zeman |
| 2,869,923 A | 1/1959 | Mulichak |
| 2,919,156 A | 12/1959 | Dodge |
| 2,939,742 A | 6/1960 | Dardarian et al. |
| 2,997,337 A | 8/1961 | Day et al. |
| 3,059,962 A | 10/1962 | Harms et al. |
| 3,154,341 A | 10/1964 | Booth |
| 3,172,695 A | 3/1965 | Bordinat, Jr. |
| 3,357,738 A | 12/1967 | Bourlier |
| 3,375,037 A | 3/1968 | Hunt, Jr. |
| 3,377,099 A | 4/1968 | Podolan |
| 3,575,464 A | 4/1971 | Himka et al. |
| 3,994,524 A | 11/1976 | Lehmann |
| 4,168,859 A | 9/1979 | Breitschwerdt et al. |
| 4,573,732 A | 3/1986 | Muscat |
| 4,634,171 A | 1/1987 | McKeag |
| 4,711,485 A | 12/1987 | Maebayashi et al. |
| 4,712,828 A | 12/1987 | Albrecht |
| 4,729,592 A | 3/1988 | Tuchiya et al. |
| 4,746,163 A | 5/1988 | Muscat |
| 4,776,630 A * | 10/1988 | Fukutomi et al. ...... 296/107.17 |
| 4,796,943 A | 1/1989 | Fukutomi et al. |
| 4,852,935 A | 8/1989 | Varner |
| 4,854,634 A | 8/1989 | Shiraishi et al. |
| 4,895,409 A | 1/1990 | Konishi et al. |
| 4,950,022 A | 8/1990 | Pattee |
| 4,958,882 A | 9/1990 | Kolb |
| 5,029,932 A | 7/1991 | Parr |
| 5,033,789 A | 7/1991 | Hayashi et al. |
| 5,035,461 A | 7/1991 | Zweigart |
| 5,067,768 A | 11/1991 | Fischbach |
| 5,078,447 A | 1/1992 | Klein et al. |
| 5,090,764 A | 2/1992 | Kogawa et al. |
| 5,161,852 A | 11/1992 | Alexander et al. |
| 5,195,798 A | 3/1993 | Klein et al. |
| 5,207,474 A | 5/1993 | Licher et al. |
| 5,209,544 A | 5/1993 | Benedetto et al. |
| 5,225,747 A | 7/1993 | Helms et al. |
| 5,429,409 A | 7/1995 | Corder et al. |
| 5,451,849 A | 9/1995 | Porter et al. |
| 5,490,709 A | 2/1996 | Rahn |
| 5,520,432 A | 5/1996 | Gmeiner et al. |
| 5,533,777 A | 7/1996 | Kleemann et al. |
| 5,542,735 A | 8/1996 | Füurst et al. |
| 5,593,202 A | 1/1997 | Corder et al. |
| 5,647,630 A | 7/1997 | Jambor et al. |
| 5,649,733 A * | 7/1997 | Seel et al. ................. 296/37.5 |
| 5,743,587 A | 4/1998 | Alexander et al. |
| 5,769,483 A | 6/1998 | Danzl et al. |
| 5,772,274 A | 6/1998 | Tokarz |
| 5,772,275 A | 6/1998 | Tokarz |
| 5,785,375 A | 7/1998 | Alexander et al. |
| 5,806,912 A | 9/1998 | Ramaciotti et al. |
| D406,792 S | 3/1999 | Alexander et al. |
| 5,975,620 A | 11/1999 | Jambor et al. |
| 5,979,970 A | 11/1999 | Rothe et al. |
| 5,988,729 A | 11/1999 | Klein |
| 6,007,143 A | 12/1999 | Lehmann et al. |
| 6,010,178 A | 1/2000 | Hahn et al. |
| 6,019,416 A | 2/2000 | Beierl |
| 6,030,023 A | 2/2000 | Guillez |
| 6,033,008 A | 3/2000 | Mattila |
| 6,033,009 A | 3/2000 | Ritter et al. |
| 6,039,382 A | 3/2000 | Mather et al. |
| 6,039,383 A | 3/2000 | Jambor et al. |
| 6,053,560 A | 4/2000 | Rothe |
| D427,138 S | 6/2000 | Alexander et al. |
| 6,168,224 B1 | 1/2001 | Henn et al. |
| 6,217,104 B1 * | 4/2001 | Neubrand .................... 296/108 |
| D442,541 S | 5/2001 | Alexander et al. |
| 6,273,492 B1 | 8/2001 | Schroder et al. |
| 6,283,532 B1 | 9/2001 | Neubrand |
| 6,299,234 B1 * | 10/2001 | Seel et al. ................... 296/108 |
| 6,312,041 B1 | 11/2001 | Queveau et al. |
| 6,312,042 B1 | 11/2001 | Halbweiss et al. |
| 6,315,349 B1 | 11/2001 | Kinnanen |
| 6,318,793 B1 | 11/2001 | Rapin et al. |
| 6,325,446 B1 | 12/2001 | Wuellrich et al. |
| 6,328,372 B1 | 12/2001 | Just |
| 6,334,644 B1 | 1/2002 | Gurtler et al. |
| 6,336,673 B1 | 1/2002 | Rothe et al. |
| 6,347,828 B1 | 2/2002 | Rapin et al. |
| 6,390,532 B1 | 5/2002 | Mac Farland |
| 6,478,362 B1 * | 11/2002 | Obendiek .................... 296/108 |
| 6,502,891 B1 | 1/2003 | Russke |
| 6,502,892 B1 * | 1/2003 | Eberle ........................ 296/108 |
| 6,505,881 B1 * | 1/2003 | Kinnanen ............... 296/107.17 |
| 6,592,169 B1 * | 7/2003 | Obendiek .............. 296/107.07 |
| 6,666,495 B1 * | 12/2003 | Nania .................... 296/107.08 |
| 6,682,125 B1 * | 1/2004 | Guillez et al. ......... 296/107.18 |
| 2001/0006297 A1 | 7/2001 | Dintner et al. |
| 2001/0019213 A1 | 9/2001 | Eberle |
| 2001/0020793 A1 | 9/2001 | Eberle |
| 2002/0185886 A1 | 12/2002 | Obendiek |

FOREIGN PATENT DOCUMENTS

| | | |
|---|---|---|
| DE | 3635373 A1 | 4/1988 |
| DE | 3635887 A1 | 5/1988 |
| DE | 3733892 A | 4/1989 |
| DE | 3816060 A | 11/1989 |
| DE | 9108242 | 12/1992 |
| DE | 4316485 A1 | 11/1994 |
| DE | 4320603 A1 | 1/1995 |
| DE | 4324708 A1 | 1/1995 |
| DE | 4438191 C1 | 7/1995 |
| DE | 4438190 C1 | 11/1995 |
| DE | 4431656 C1 | 12/1995 |
| DE | 4445580 C1 | 12/1995 |
| DE | 4445941 C1 | 3/1996 |
| DE | 4445944 C1 | 4/1996 |
| DE | 4446483 A1 | 6/1996 |
| DE | 19517063 C1 | 6/1996 |
| DE | 4445920 A1 | 7/1996 |
| DE | 19514022 C1 | 9/1996 |
| DE | 19518071 A1 | 11/1996 |
| DE | 19532568 C1 | 11/1996 |
| DE | 19532567 C1 | 12/1996 |
| EP | 0261379 A2 | 4/1987 |
| EP | 0494366 A2 | 7/1992 |
| FR | 1049026 | 12/1953 |
| FR | 2 818 931 | 7/2002 |
| GB | 413467 | 7/1934 |
| GB | 756531 | 9/1956 |
| GB | 978638 | 12/1964 |
| JP | 62-120222 | 6/1987 |
| JP | 2-51925 | 4/1990 |
| JP | 2-144226 | 4/1990 |

OTHER PUBLICATIONS

Treser T1 / 1987–198x (believed to have been offered for sale, publicly used, and/or published prior to the filing date of this application).

Valmet Boreal / 1997 (believed to have been offered for sale, publicly used, and/or published prior to the filing date of this application).

Volvo C70 Coupé Convertible / 2002 (believed to have been offered for sale, publicly used, and/or published prior to the filing date of this application).

Volvo C70 Hatric / 2001 (believed to have been offered for sale, publicly used, and/or published prior to the filing date of this application).
Volvo Lowrider / 19xx (believed to have been offered for sale, publicly used, and/or published prior to the filing date of this application).
Alfa Romeo Proteo Or Alfa Romeo 164 Proteo / 1991 (believed to have been offered for sale, publicly used, and/or published prior to the filing date of this application).
Alfa Romeo Spider Rht / 2001 (believed to have been offered for sale, publicly used, and/or published prior to the filing date of this application).
Audi Quattro Roadster / 1984 (believed to have been offered for sale, publicly used, and/or published prior to the filing date of this application).
Bentley Retractable Hardtop / 1999 (believed to have been offered for sale, publicly used, and/or published prior to the filing date of this application).
Bérard Roadster / 2001 (believed to have been offered for sale, publicly used, and/or published prior to the filing date of this application).
BMW Klapp Top / 2000 (believed to have been offered for sale, publicly used, and/or published prior to the filing date of this application).
BMW Oasys Vision / 2002 (believed to have been offered for sale, publicly used, and/or published prior to the filing date of this application).
Buick Blackhawk / 2000 (believed to have been offered for sale, publicly used, and/or published prior to the filing date of this application).
C&C Intrigue / 1990 (believed to have been offered for sale, publicly used, and/or published prior to the filing date of this application).
Cadillac Allanté Charisma / 1994 (believed to have been offered for sale, publicly used, and/or published prior to the filing date of this application).
Cadillac Evoq / 1999 (believed to have been offered for sale, publicly used, and/or published prior to the filing date of this application).
Cadillac XLR / 2003 (believed to have been offered for sale, publicly used, and/or published prior to the filing date of this application).
Chevrolet Corvette Retractable Hardtop / 1958 (believed to have been offered for sale, publicly used, and/or published prior to the filing date of this application).
Chevrolet SSR / 2000 (believed to have been offered for sale, publicly used, and/or published prior to the filing date of this application).
Chevrolet SSR / 2001 (believed to have been offered for sale, publicly used, and/or published prior to the filing date of this application).
Chrysler Dart / 1957 (believed to have been offered for sale, publicly used, and/or published prior to the filing date of this application).
Chrysler Phaeton / 1997 (believed to have been offered for sale, publicly used, and/or published prior to the filing date of this application).
Chrysler Thunderbolt / 1941 (believed to have been offered for sale, publicly used, and/or published prior to the filing date of this application).
Citroën 11 Légère / 1952 (believed to have been offered for sale, publicly used, and/or published prior to the filing date of this application).
Citroën 15 Six / 1950 (believed to have been offered for sale, publicly used, and/or published prior to the filing date of this application).
Daihatsu Copen / 2001 (believed to have been offered for sale, publicly used, and/or published prior to the filing date of this application).
Daihatsu Kopen / 1999 (believed to have been offered for sale, publicly used, and/or published prior to the filing date of this application).
Edsel Retractable Hardtop / 1958 (believed to have been offered for sale, publicly used, and/or published prior to the filing date of this application).
Edsel Skyliner / 1958 (believed to have been offered for sale, publicly used, and/or published prior to the filing date of this application).
Ferrari Testarossa St. Tropez / 1992 (believed to have been offered for sale, publicly used, and/or published prior to the filing date of this application).
Fiat Punto Wish / 1999 (believed to have been offered for sale, publicly used, and/or published prior to the filing date of this application).
Ford Fairlane 500 Skyliner / 1957 (believed to have been offered for sale, publicly used, and/or published prior to the filing date of this application).
Ford Failane 500 Skyliner / 1958 (believed to have been offered for sale, publicly used, and/or published prior to the filing date of this application).
Ford Focus Cabriolet RHT / 1999 (believed to have been offered for sale, publicly used, and/or published prior to the filing date of this application).
Ford Galaxie Skyliner / 1959 (believed to have been offered for sale, publicly used, and/or published prior to the filing date of this application).
Ford Mustang Restro–mod / 1964 (believed to have been offered for sale, publicly used, and/or published prior to the filing date of this application).
Ford Mustang Retractable Hardtop / 1964 (believed to have been offered for sale, publicly used, and/or published prior to the filing date of this application).
Ford Mustang Retractable Hardtop / 1966 (believed to have been offered for sale, publicly used, and/or published prior to the filing date of this application).
Gaylord Gladiator / 1955 (believed to have been offered for sale, publicly used, and/or published prior to the filing date of this application).
Heuliez Hardtop Intruder / 1998 (believed to have been offered for sale, publicly used, and/or published prior to the filing date of this application).
Heuliez Raffica / 1992 (believed to have been offered for sale, publicly used, and/or published prior to the filing date of this application).
Heuliez Retractop 10 / 2001 (believed to have been offered for sale, publicly used, and/or published prior to the filing date of this application).
Heuliez Retractrop 2 / 2000 (believed to have been offered for sale, publicly used, and/or published prior to the filing date of this application).
Honda Argento Vivo / 1995 (believed to have been offered for sale, publicly used, and/or published prior to the filing date of this application).
Hudson Super Six / 1922 (believed to have been offered for sale, publicly used, and/or published prior to the filing date of this application).
Hudson Super Xix / 1923 (believed to have been offered for sale, publicly used, and/or published prior to the filing date of this application).
Isuzu VX–02 / 1999 (believed to have been offered for sale, publicly used, and/or published prior to the filing date of this application).

Karmann Coupé–Cabrio / 1999 (believed to have been offered for sale, publicly used, and/or published prior to the filing date of this application).
Kelnath GT/R / 1996 (believed to have been offered for sale, publicly used, and/or published prior to the filing date of this application).
Lada Roadster / 2000 (believed to have been offered for sale, publicly used, and/or published prior to the filing date of this application).
Lancia Belna Éclipse / 1934 (believed to have been offered for sale, publicly used, and/or published prior to the filing date of this application).
Lexus SC430 / 2000 (believed to have been offered for sale, publicly used, and/or published prior to the filing date of this application).
Lexus Sport Coupé / 1999 (believed to have been offered for sale, publicly used, and/or published prior to the filing date of this application).
Mercedes–Benz GLK / 1999 (believed to have been offered for sale, publicly used, and/or published prior to the filing date of this application).
Mercedes–Benz Magic Top / 1984 (believed to have been offered for sale, publicly used, and/or published prior to the filing date of this application).
Mercedes–Benz SL / 2001 (believed to have been offered for sale, publicly used, and/or published prior to the filing date of this application).
Mercedes–Benz SLK Paris / 1994 (believed to have been offered for sale, publicly used, and/or published prior to the filing date of this application).
Mercedes–Benz SLK/ 1996 (believed to have been offered for sale, publicly used, and/or published prior to the filing date of this application).
Michalak Corsaspider / 1984 (believed to have been offered for sale, publicly used, and/or published prior to the filing date of this application).
Mitsubishi 3000 GT Spyder / 1994 (believed to have been offered for sale, publicly used, and/or published prior to the filing date of this application).
Mitsubishi Colt Aiolia / 1998 (believed to have been offered for sale, publicly used, and/or published prior to the filing date of this application).
Mohs Safarikar / 1972 (believed to have been offered for sale, publicly used, and/or published prior to the filing date of this application).
Nissan 300 ZX / 1992 (believed to have been offered for sale, publicly used, and/or published prior to the filing date of this application).
Nissan Luc–2 / 1985 (believed to have been offered for sale, publicly used, and/or published prior to the filing date of this application).
Nissan Micra C+C / 2002 (believed to have been offered for sale, publicly used, and/or published prior to the filing date of this application).
Nissan Silvia Varietta / 1999 (believed to have been offered for sale, publicly used, and/or published prior to the filing date of this application).
Oldsmobile F–88 MK3 / 1959 (believed to have been offered for sale, publicly used, and/or published prior to the filing date of this application).
Opel Coupé Roadster / 2004 (believed to have been offered for sale, publicly used, and/or published prior to the filing date of this application).
Paxton / 1951 (believed to have been offered for sale, publicly used, and/or published prior to the filing date of this application).
Peugeot 106 Spider / 1992 (believed to have been offered for sale, publicly used, and/or published prior to the filing date of this application).
Peugeot 20♥/ 1998 (believed to have been offered for sale, publicly used, and/or published prior to the filing date of this application).
Peugeot 202 Éclipse / 1938 (believed to have been offered for sale, publicly used, and/or published prior to the filing date of this application).
Peugeot 206 CC / 2000 (believed to have been offered for sale, publicly used, and/or published prior to the filing date of this application).
Peugeot 206 CC Ciel Bleu / 2001 (believed to have been offered for sale, publicly used, and/or published prior to the filing date of this application).
Peugeot 3♥7 CC/2002 (believed to have been offered for sale, publicly used, and/or published prior to the filing date of this application).
Peugeot 301 Éclipse / 1934 (believed to have been offered for sale, publicly used, and/or published prior to the filing date of this application).
Peugeot 401d Éclipse / 1934 (believed to have been offered for sale, publicly used, and/or published prior to the filing date of this application).
Peugeot 402 Éclipse Électrique / 1935 (believed to have been offered for sale, publicly used, and/or published prior to the filing date of this application).
Peugeot 402 Éclipse Mécanique / 1936 (believed to have been offered for sale, publicly used, and/or published prior to the filing date of this application).
Peugeot 402b Éclipse Mécanique / 1938 (believed to have been offered for sale, publicly used, and/or published prior to the filing date of this application).
Peugeot 601c Éclipse / 1934 (believed to have been offered for sale, publicly used, and/or published prior to the filing date of this application).
Peugeot 601d Éclipse / 1934 (believed to have been offered for sale, publicly used, and/or published prior to the filing date of this application).
Peugeot 601dl Éclipse / 1934 (believed to have been offered for sale, publicly used, and/or published prior to the filing date of this application).
Peugeot 607 Paladine / 2000 (believed to have been offered for sale, publicly used, and/or published prior to the filing date of this application).
Peugeot Crisalys / 1998 (believed to have been offered for sale, publicly used, and/or published prior to the filing date of this application).
Playboy / 1947 (believed to have been offered for sale, publicly used, and/or published prior to the filing date of this application).
Scimitar Hard–Top Convertible / 1959 (believed to have been offered for sale, publicly used, and/or published prior to the filing date of this application).
Skyline X–50 / 1953 (believed to have been offered for sale, publicly used, and/or published prior to the filing date of this application).
Suzuki C2 / 1997 (believed to have been offered for sale, publicly used, and/or published prior to the filing date of this application).

\* cited by examiner

HARDTOP CONVERTIBLE

FIELD OF THE INVENTION

The present invention relates to convertible roofs and more specifically to a hardtop convertible roof.

BACKGROUND AND SUMMARY OF THE INVENTION

It is known to provide a retractable hardtop convertible roof for an automotive vehicle. Traditionally, such hardtop convertible roofs have been accomplished by employing a plurality of rigid roof panels which either slide rearwardly over one another during retraction or pivot relative to one another an adjacent position during retraction. These retracting roof panels are mechanically stowed behind a passenger seating area or in a trunk of the automotive vehicle. When stowing the roof panels in the trunk, the roof panels intrude on the trunk space and may preempt storage space within the trunk such that the trunk is not usable when the roof panels are retracted. On vehicles with shorter passenger seating compartments, the retractable hardtop convertible roof usually employs two panels and on vehicles with longer passenger seating compartments, the retractable hardtop convertible roof usually employs three panels in an attempt to minimize the packaging space required for stowing the retracted panels. Even the use of three panels, however, infringes into the trunk space and can preempt storage space within the trunk. Therefore, it would be desirable to have a retractable hardtop convertible roof that minimizes the packaging space occupied when retracted to maximize the available storage space within the trunk when the hardtop convertible roof is retracted.

When storing the retracted panels of the hardtop convertible roof behind the passenger space, the rear wheel wells or housings of the vehicle present an obstruction between and around which the panels of the hardtop convertible roof are maneuvered or positioned when being retracted and stowed in the retracted position. To overcome the obstruction of the wheel housings, a hardtop convertible roof was developed that provided a means for retracting and extending the front and rear roof sections clear of the obtrusive rear wheel housings within the automotive vehicle body. An example of such a system is disclosed in U.S. Pat. No. 5,785,375 entitled "Retractable Hard-Top for an Automotive Vehicle" which issued to Alexander et al., the disclosure of which is incorporated herein by reference. However, this approach required a semi-complex mechanism to perform the movements of the front and rear roof sections in order to clear the rear wheel housings. Therefore, it would be desirable to have a retractable hardtop convertible roof for an automotive vehicle which clears a pair of obstructing wheel housings during retraction and accomplishes such with simple mechanical linkages and arrangements. Additionally, it would be advantageous if such a mechanism maintained a significant amount of storage space within the vehicle's trunk when in the retracted position.

In an attempt to maximize storage space, some retractable hardtop convertible roof systems have been developed which swing a rigid roof member into a passenger compartment of the automotive vehicle. Furthermore, these systems stow the retracted roof panels in a substantially vertical orientation behind either the front or rear seats. While these conventional systems maintain the storage space within the trunk, the retracted roof panels are often stored in an unsightly manner. Examples of two such systems are disclosed in U.S. Pat. No. 5,195,798 entitled "Retractable Roof for Vehicles" which issued to Klein et al., and U.S. Pat. No. 4,854,634 entitled "Upper Body Structure for a Convertible Vehicle" which issued to Shiraishi et al. Therefore, it would be desirable to have a retractable hardtop convertible roof for an automotive vehicle which retracts to an aesthetically pleasing position and maintains storage space within the vehicle's trunk while avoiding the aforementioned problems.

In accordance with the present invention, the preferred embodiment of a hardtop convertible roof for an automotive vehicle includes at least three rigid roof panels that are each retractable and wherein at least two of the panels are directly connected to fixed pivots and rotate about the fixed pivot when being retracted. In another aspect, one of the panels is directly connected to a fixed pivot that is located between rear wheel housings on the vehicle and the panel rotates about the fixed pivot when moving between raised and stowed positions. In yet another aspect, a rearmost roof section is directly connected to a fixed pivot and rotates rearwardly about the fixed pivot less than about 90° when moving from the raised to the stowed position. In a different aspect, the convertible roof for a vehicle includes at least four substantially rigid roof sections that are retractable and at least one of the roof sections is directly connected to a fixed pivot about which it rotates when moving between the raised and stowed positions.

The present invention is advantageous over traditional designs in that a number of the roof panels are directly connected to fixed pivots which simplifies the mechanism used to move the roof panels between raised and stowed positions. Furthermore, the present invention is advantageous through the use of four roof panels which allows for efficient stowing of the panels when retracted and minimizes the intrusion into the trunk space. The present invention also provides a system for retracting and extending the roof sections without being hindered by the obtrusive rear wheel housings within the automotive vehicle body. Furthermore, the present invention is advantageous in that an exterior surface of one of the roof panels covers a portion of the stowage area within which the hardtop convertible roof is stowed when retracted to provide an aesthetically pleasing appearance. Additional advantages and features of the present invention will become apparent from the following description and appended claims, taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
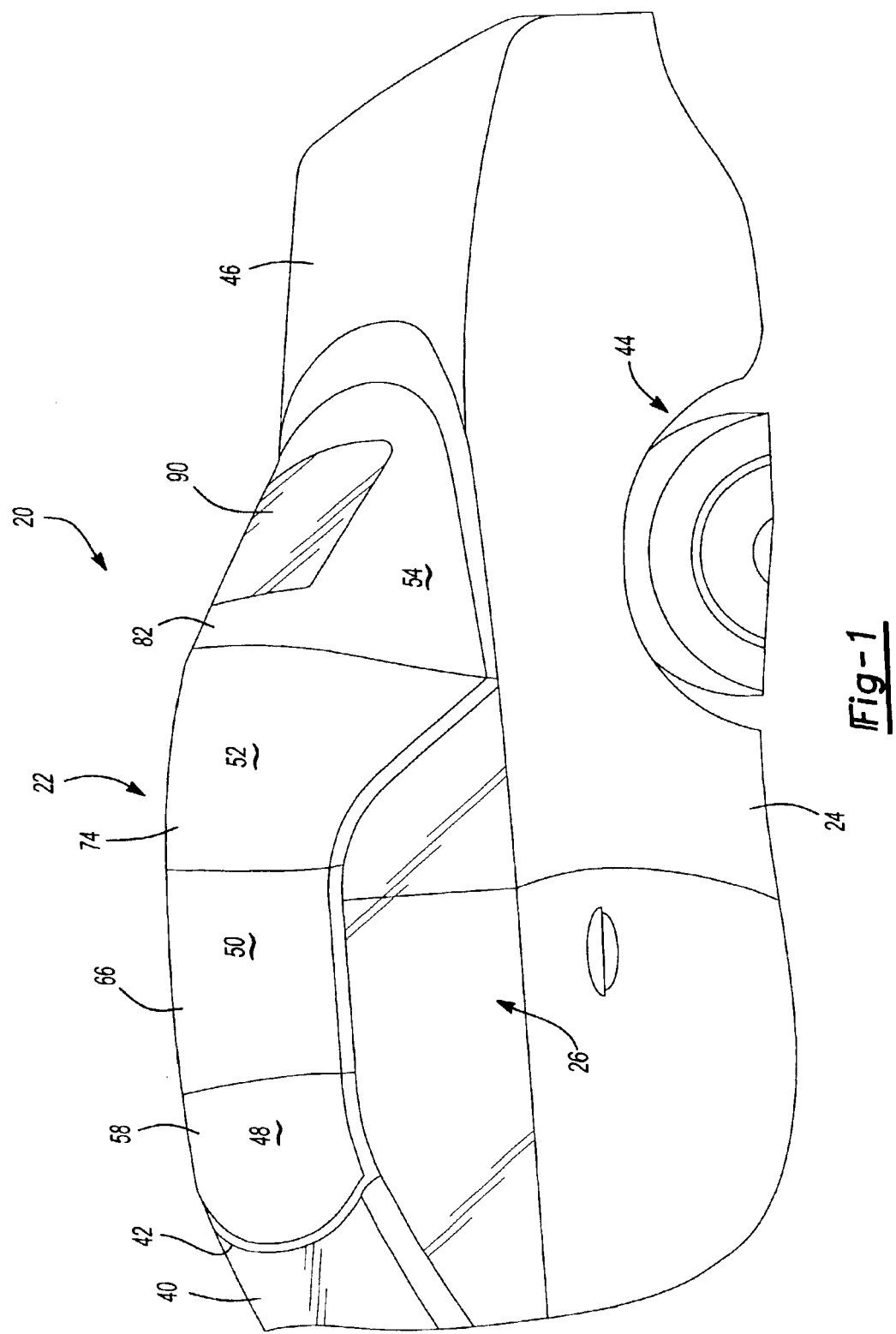
FIG. 1 is a partial perspective view of an automotive vehicle having a hardtop convertible roof according to the principles of the present invention.

The following description of the preferred embodiment is merely exemplary in nature and is in no way intended to limit the invention, its application, or uses.

The present invention is described for illustration purposes embodied in a hydro-mechanically actuated four-piece hardtop convertible roof for an automotive vehicle. It will be appreciated, however, that the principles of the present invention are readily adaptable to a number of other devices which can retract or deploy a multi-section roof top in a vehicle including a soft top, or flexible fabric covered roof where the actuator or retraction mechanisms are coupled to side rails, or any combined hard and soft top roof.

With reference to FIGS. 1–5, an exemplary automotive vehicle 20 includes a hardtop convertible roof 22 constructed in accordance with the teachings of the present invention. Vehicle 20 is constructed with a body 24 having a passenger compartment 26 and a storage area or trunk 28 aft of passenger compartment 26, and separated by a rear seat back cushion or metal seat pack panel (not shown). Storage area 28 provides general storage in vehicle 20 along with stowing convertible roof 22 when in the retracted position.

Storage area 28 can be divided into a stowage compartment 30 and a miscellaneous storage compartment 32 by placing a physical barrier in storage compartment 28 to separate it into stowage compartment 30 and miscellaneous storage compartment 32. The physical barrier can be a fixed physical barrier that inhibits use of stowage compartment 30 for anything other than stowage of convertible roof 22 or can be a retractable barrier 34, as shown. Retractable barrier 34 can be lowered when convertible roof 22 is in the raised position to allow an entirety of storage area 28 to be utilized for storage. Retractable barrier 34 can then be raised to provide a physical barrier between stowage compartment 30 and miscellaneous storage compartment 32 so that foreign objects are not inadvertently put into stowage compartment 30 which could inhibit retraction of convertible roof 22 into stowage compartment 30 and/or damage convertible roof 22. Preferably, there is a sensor on retractable barrier 34 that prevents retraction of convertible roof 22 unless retractable barrier 34 in its raised position. Retractable barrier 34 is a flexible fabric or PVC vinyl roller shade that can be raised to a generally vertical planar position and manually hooked into slotted receivers attached to the vehicle body 28.

Passenger compartment 26 includes front and rear seating areas 36 and 38 in which passengers in vehicle 20 can sit. Passenger compartment 26 also includes a windshield 40 and a header 42. Header 42 spans transversely across the top of windshield 40. Storage area 28 is located behind rear seating area 38. Rear wheel housings 44 intrude into rear seating area 38 and stowage compartment 30 of storage area 28.

Vehicle 20 includes a trunk lid 46 that is pivotably coupled to body 24 to selectively enclose stowage compartment 30. Trunk lid 46 can be moved between open and closed positions to allow retraction and extension of convertible roof 22 as described below. Trunk lid 46 can take a variety of forms. For example, trunk lid 46 can be a two-way opening trunk lid that can open in one direction to allow extension and retraction of convertible roof 22 and can be opened in an opposite direction to allow access to miscellaneous storage compartment 32, such as that disclosed in U.S. Pat. No. 5,823,606, entitled "Hard-Top Vehicle" issued to Schenk et al., the disclosure of which is incorporated by reference herein. Alternately, vehicle 20 can have a separate trunk lid and tonneau panel (not shown) that are each independently operable to allow access to miscellaneous storage compartment 32 and stowage compartment 30.

Convertible roof 22 includes a first or forwardmost roof section or panel 48, a second or intermediate roof section or panel 50, a third or intermediate roof section or panel 52 and a fourth or rearmost roof section or panel 54. Convertible roof 22 is movable from a raised position depicted in FIGS. 1 and 2 through intermediate positions such as the position depicted in FIG. 3 to a stowed position depicted in FIGS. 4 and 5. Each of the first, second, third and fourth roof sections 48, 50, 52 and 54 are substantially rigid members interconnected to one another, as described below.

Convertible roof 22 and the linkages interconnecting the various panels of convertible roof 22 are shown symmetrical about a longitudinal, fore-and-aft centerline (not shown) of vehicle 20. Convertible roof 22 includes right and left roof linkages on the respective right and left sides of vehicle 20. For brevity, only one side of convertible roof 20 and the associated linkages are shown and discussed, however, it should be understood that opposite side linkages are also provided as part of convertible roof 22 and are mirror images of the side discussed. Also, when using the terms "fore" and "aft" and "front" and "back" in describing components of convertible roof 22, such reference refers to the orientation of the components when convertible roof 22 is in the fully raised position.

First roof section 48 is a substantially rigid panel having an outer surface 58, an inner surface 60, a leading edge 62 and a trailing edge 64. First roof section 48 includes a conventional latching mechanism (not shown) which is disengageably attachable with header 42 when convertible roof 22 is in the raised position. Leading edge 62 sealingly engages header 42 when the latching mechanism secures first roof section 48 to header 42.

Second roof section 50 is a substantially rigid panel having an outer surface 66, an inner surface 68, a leading edge 70 and a trailing edge 72. Leading edge 70 sealingly engages trailing edge 64 of first roof section 48 when convertible roof 22 is in the raised position. Furthermore, third roof section 52 is a substantially rigid panel having an outer surface 74, an inner surface 76, a leading edge 78 and a trailing edge 80. Leading edge 78 sealingly engages trailing edge 72 of second roof section 50 when convertible roof 22 is in the raised position.

Fourth roof section 54 is a substantially rigid panel having an outer surface 82, an inner surface 84, a leading edge 86 and a trailing edge 88. Leading edge 86 sealingly engages trailing edge 80 of third roof section 52 when convertible roof 22 is in the raised position. Trailing edge 88 includes lip seals (not shown) which sealingly engage trunk lid 46 when fourth roof section 54 is in the raised position. Fourth roof section 54 also includes a transparent window 90. Preferably, window 90 is a three-dimensionally curved glass member matching the contour of the rear portion of fourth roof section 54. Alternately, window 90 may be a flexible transparent panel constructed from PVC or other suitable material.

Roof sections 48, 50, 52 and 54 are interconnected by a variety of linkage mechanisms and through fixed pivots connected to body 24 of vehicle 20, as described below. The interconnection of these sections 48, 50, 52 and 54 by the various linkages and pivots enables the retraction and extension of convertible roof 22 in a controlled manner through the use of a single actuator 92 on each side of convertible roof 22 as described below. One end of a balance link 94 is pivotally connected to first roof section 48 at pivot 96 while an opposite end of balance link 94 is pivotally connected to body 24 of vehicle 20 at fixed pivot 98. First roof section 48 is pivotally connected to second roof section 50 at pivot 100. Pivot 100 can take a variety of forms, such as a hinge having a pair of clasps attached to both the first and second roof sections 48 and 50. Pivot 100 enables first roof section 48 to rotate relative to second roof section 50 when convertible roof 22 is being moved between raised and stowed positions, as described below.

Second roof section 50 has an integral arm or extension 102 that extends from the main portion of second roof section 50. Arm 102 is pivotally connected to body 24 of vehicle 20 at fixed pivot 104. Second roof section 50 is thereby connected to fixed pivot 104 and is limited to rotational movement about fixed pivot 104 when moving between the raised and stowed positions. Arm 102 is pivotally connected to a first control link 108 at pivot 110. First control link 108 is operable to control movement of third roof section 52, as described below. Arm 102 is an integral extension of second roof section 50 such that arm 102 does not move relative to second roof section 50. Alternately, arm 102 can be a separate link that is fixedly attached to second roof section 50 such that the separate link does not move relative to second roof section 50 when convertible roof 22 is moving between raised and stowed positions.

Actuator 92 is coupled to arm 102 of second roof section 50 and provides a torque that causes arm 102 to rotate about fixed pivot 104 and convertible roof 22 to move between raised and stowed positions, as described below. Actuator 92 can take a variety of forms. For example, actuator 92 can be a rotary actuator such as that disclosed in U.S. Pat. No. 5,467,596 entitled "Unitary Electro-Hydraulic Rotary Actuator for Automotive Convertible Top" issued to Yu, the disclosure of which is incorporated herein by reference.

The interconnections between first and second roof sections 48 and 50 form a four-bar linkage assembly that controls and coordinates the movement of first and second roof sections 48 and 50 relative to one another. The four-bar linkage assembly includes balance link 94, first roof section 48 second roof section 50 and body 24 and is defined by pivots 96, 100, 104 and 98.

Third roof section 52 has an integral arm or extension 110 that extends from the main portion of third roof section 52 and is attached to body 24 at fixed pivot 112. The attachment of arm 110 to fixed pivot 112 limits movement of third roof section 52 to rotational movement about fixed pivot 112 when convertible roof 22 moves between the raised and stowed positions. First control link 108 is pivotally connected to an intermediate portion of arm 110 adjacent fixed pivot 112 at pivot 114. First control link 108 coordinates movement of third roof section 52 with movement of second roof section 50, as described below. An end of arm 110 is pivotally connected to one end of a second control link 118 at pivot 120. Second control link 118 coordinates movement of third and fourth roof sections 52 and 54 relative to one another as described below. Arm 110 is an integral extension of third roof section 52 such that arm 110 does not move relative to third roof section 52. Alternately, arm 110 can be a separate link that is fixedly attached to third roof section 52 such that the separate link does not move relative to third roof section 52 when convertible roof 22 is moving between raised and stowed positions.

The interconnection between second and third roof sections 50 and 52 form a four-bar linkage assembly that controls and coordinates movement of second and third roof sections 50 and 52 relative to one another. The four-bar linkage assembly includes arm 102, first control link 108, arm 110, and body 24 and is defined by pivots 110, 114, 112, and 104. The interconnection of second and third roof sections 50 and 52 also creates a six-bar linkage assembly coupling first roof section 48 to third roof section 52 that coordinates and controls movement of first, second and third roof sections 48, 50 and 52. The six-bar linkage assembly includes balance link 94, first roof section 48, second roof section 50, first control link 108, third roof section 52 and body 24, and is defined by pivots 96, 100, 104, 110, 114, 112 and 98.

Figure 6:
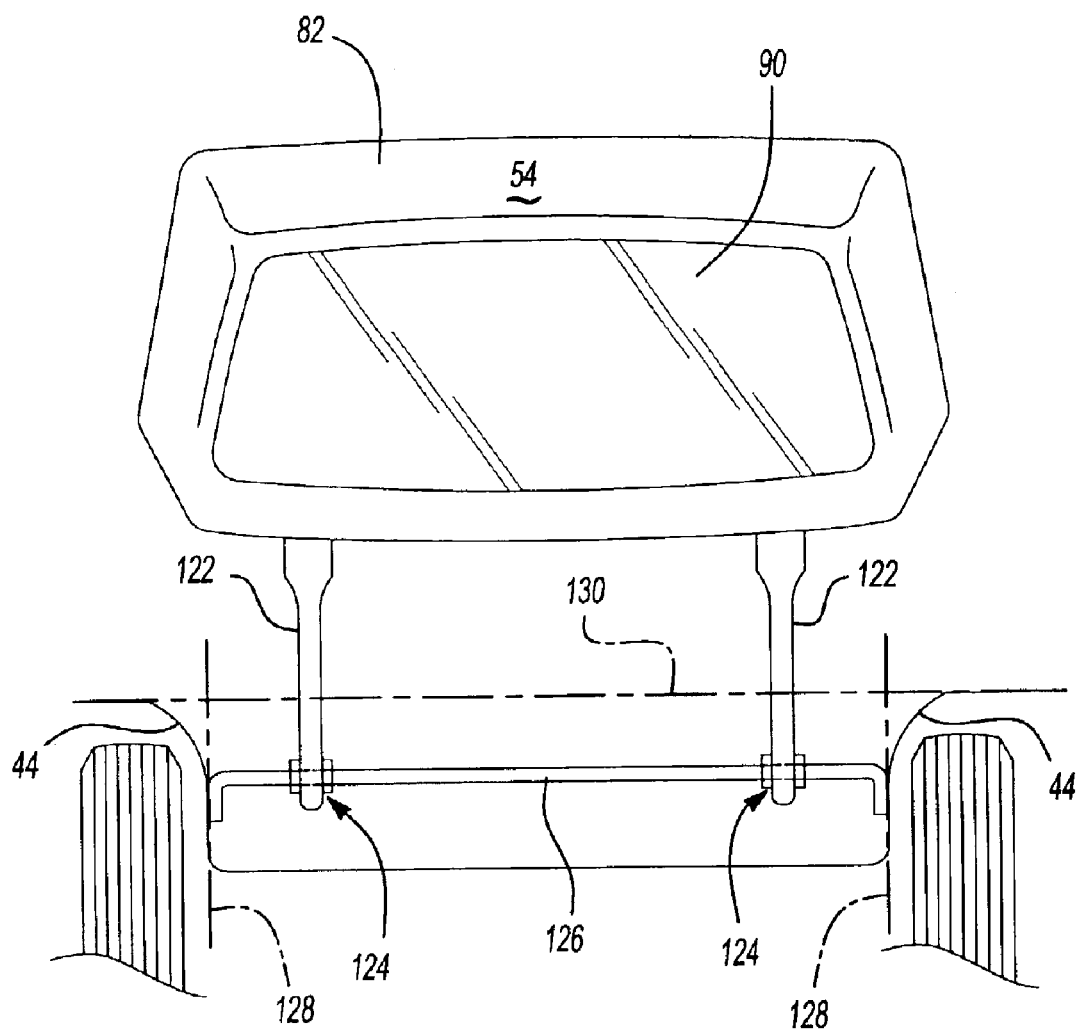
FIG. 6 is a diagrammatic view of a portion of the hardtop convertible roof according to the principles of the present invention illustrating the rearmost roof panel and the pivot between wheel housings of a vehicle.

Fourth roof section 54 has an integral arm or extension 122 that is pivotally connected to body 24 at fixed pivot 124. Specifically, as shown in FIG. 6, arm 122 is pivotally connected to a cross bar 126 at fixed pivot 124. Cross bar 126 is fixedly attached to body 24 between rear wheel housings 44. With this connection, fixed pivot 124 is located between vertical planes, indicated as lines 128, that are defined by the inner sides of rear wheel housings 44. Furthermore, pivot 124 is located below a horizontal plane indicated as line 130 which is defined by the tops of rear wheel housings 44. The connecting of arm 122 to pivots 124 that are located between rear wheel housings 44 and below the tops of rear wheel housings 44, facilitates the movement of fourth roof section 54 around the obstructions caused by rear wheel housings 44. The pivotal connection between fourth roof section 54 and body 24 at fixed pivot 124 limits movement of fourth roof section 54 to rotational movement about fixed pivot 124 as convertible roof 122 moves between raised and stowed positions.

An end of arm 122 is pivotally connected to an end of second control link 118 at pivot 134. The pivotal connection to second control link 118 allows second control link 118 to control and coordinate movement of third and fourth roof sections 52 and 54 relative to one another, as described below. Arm 122 is an integral extension of fourth roof section 54 and does not move relative to fourth roof section 54. Alternately, arm 122 can be a separate link that is fixedly attached to fourth roof section 54 such that no movement of the separate link relative to fourth roof section 54 occurs when convertible roof 22 moves between the raised and stowed positions.

The interconnection between third and fourth roof sections 52 and 54 form a four-bar linkage assembly that controls and coordinates movement of third and fourth roof sections 52 and 54 relative to one another. The four-bar linkage assembly includes arm 110, second control link 118, arm 122 and body 24 and is defined by pivots 120, 134, 124 and 112.

The interconnection between third and fourth roof sections 52 and 54 in conjunction with the interconnection between second and third roof sections 50 and 52 form a six-bar linkage assembly that coordinates movement of second, third and fourth roof sections 50, 52 and 54 relative to one another. The six-bar linkage assembly includes arm 102, first control link 108, arm 110, second control link 118, arm 122 and body 24, and is defined by pivots 110, 114, 112, 120, 134, 124, and 104. The interconnections between first, second, third and fourth roof section 48, 50, 52 and 54 forms an eight-bar linkage assembly that controls and coordinates movement of first, second, third and fourth roof sections 48, 50, 52 and 54 relative to one another. The eight-bar linkage assembly includes balance link 94, first roof section 48, second roof section 50, first control link 108, arm 110, second control link 118, arm 122 and body 24 and is defined by pivots 96, 100, 104, 110, 114, 112, 120, 134, 124, and 98.

It should be appreciated that if first control link 108 were removed, third and fourth roof sections 52 and 54 would articulate independently from first and second roof sections 48 and 50. Accordingly, first control link 108 allows the use of a single actuator 92 to drive each roof section in a coordinated manner relative to one another between the raised and stowed positions. It should further be appreciated that if second control link 118 were removed, fourth roof section 54 would articulate independently from first, second and third roof sections 48, 50 and 52. Accordingly, second control link 118 allows the use of a single actuator 92 to drive each roof section in a coordinated manner relative to one another between the raised and stowed positions.

An alternate embodiment exists by removing first control link 108 and coupling a second actuator (not shown) to third roof section 52, fourth roof section 54 or second control link 118 to drive movement of third and fourth roof sections 52 and 54. A control mechanism (not shown) capable of sensing the position of first and/or second roof sections 48 and 50 and sensing the position of third and/or fourth roof sections 52 and 54 is employed to assure that convertible roof 22 may be moved between the raised and stowed positions without causing binding or interference between the roof sections or any other vehicle components.

Another alternate embodiment exists by removing second control link 118 and coupling fourth roof section 54 to a second actuator (not shown) to drive fourth roof section 54. A control mechanism (not shown) capable of sensing the position of first, second and/or third roof sections 48, 50 and 52 and of sensing the position of fourth roof section 54 is employed to assure that convertible roof 22 may be moved between the raised and stowed positions without causing binding or interference between the roof sections or any other vehicle components.

The preferred embodiment of convertible roof 22 includes four fixed pivots 98, 104, 112, and 124 that are located on each side of vehicle 20. The fixed pivots 98, 104, 112, 124 can be directly connected to body 24 or connected to body 24 through one or more brackets (not shown) that are affixed to body 24 such that the fixed pivots are fixed relative to body 24 and are thus an extension of body 24. Fixed pivots 98 and 104 are located above a belt line 138 (FIG. 3) of vehicle 20. With fixed pivots 98 and 104 being located above belt line 138, fixed pivots 98 and 104 are preferably attached to a bracket (not shown) that is fixedly attached to body 24 and extends upwardly above belt line 138. Fixed pivots 98 and 104 and the associated bracket are preferably covered by quarter trim panels (not shown) of vehicle 20 to provide an aesthetically pleasing appearance.

Trunk lid 46 is pivotally coupled to body 24. Trunk lid 46 is preferably operated by a separate control system (not shown) capable of moving trunk lid 46 from a closed position depicted in FIGS. 1–2 and 4–5 to an open position depicted in FIG. 3. The control system functions to coordinate movement of trunk lid 46 with convertible roof 22 such that stowage compartment 30 is accessible when moving convertible roof 22 between the raised and stowed positions. Alternately, trunk lid 46 may be manually operated and selectively latched to body 24. As such, stowage compartment 30 is selectively enclosed or accessible. The manually operated trunk lid 46 includes a biasing mechanism, such as a spring, (not shown) for urging trunk lid 46 toward the open position.

Figure 2:
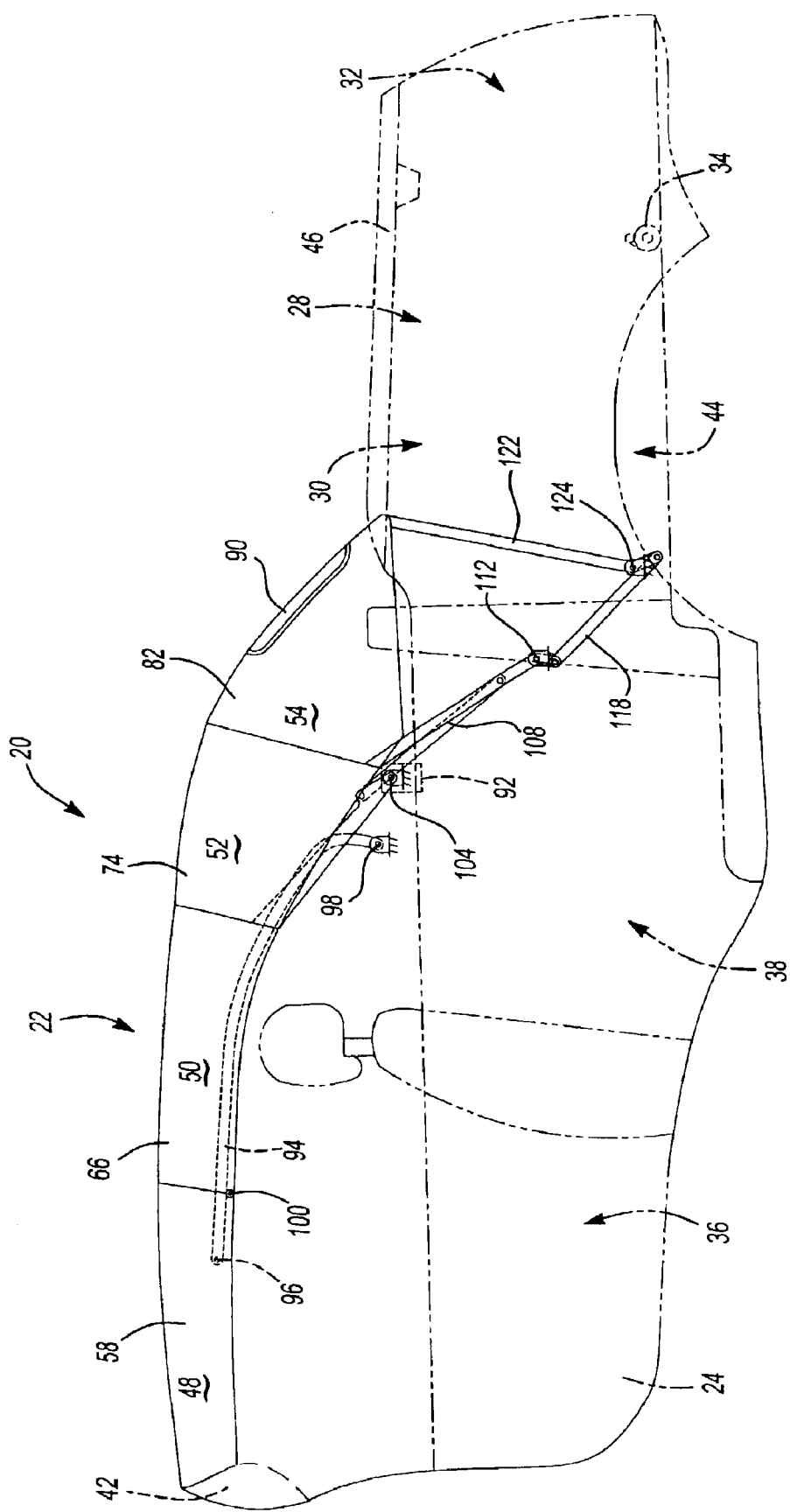
FIG. 2 is a partial side elevation view of the vehicle of FIG. 1 with the hardtop convertible roof according to the principles of the present invention in a raised position.
Figure 3:
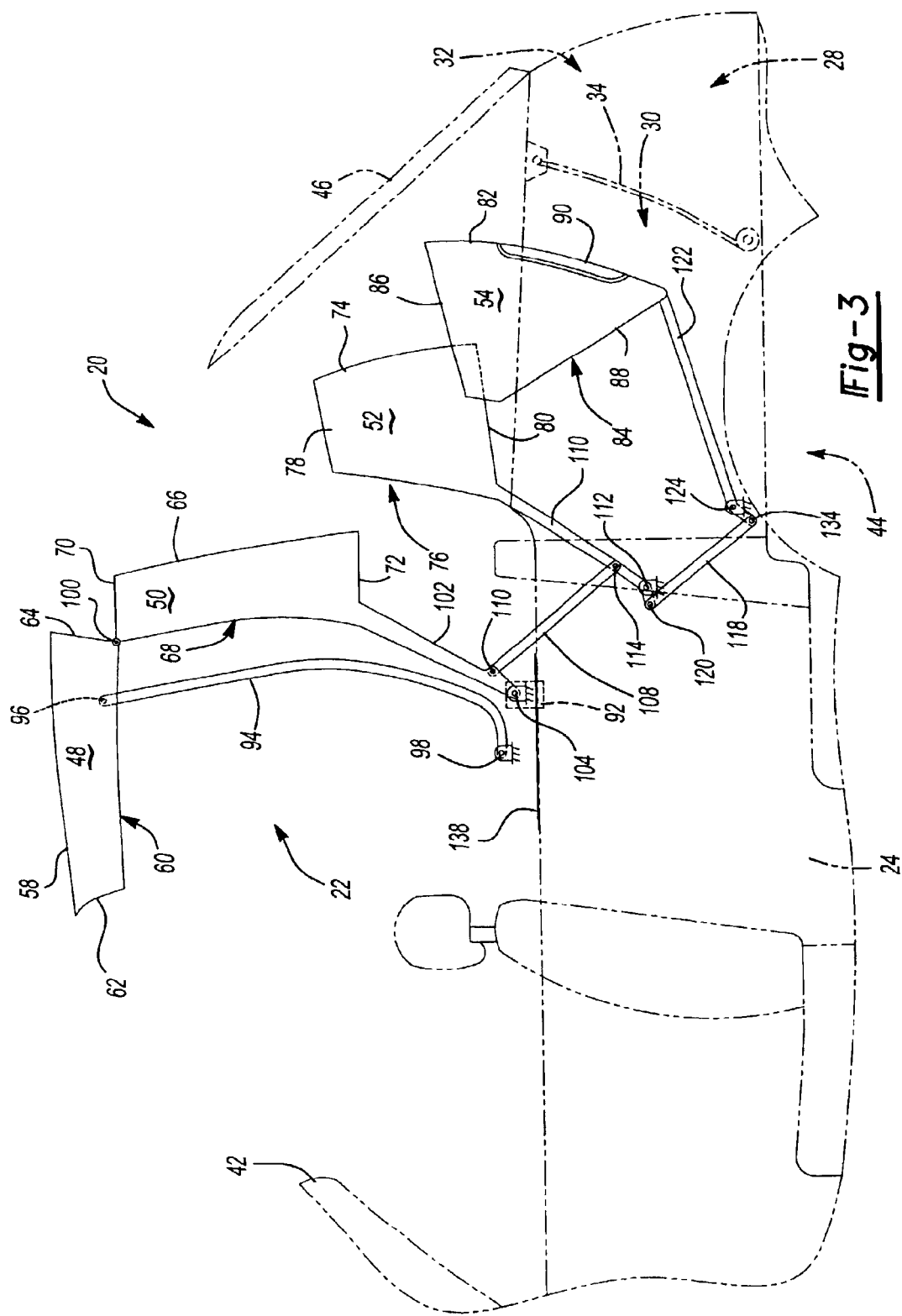
FIG. 3 is a partial side elevation view of the vehicle of FIG. 2 with the hardtop convertible roof in an intermediate position.
Figure 4:
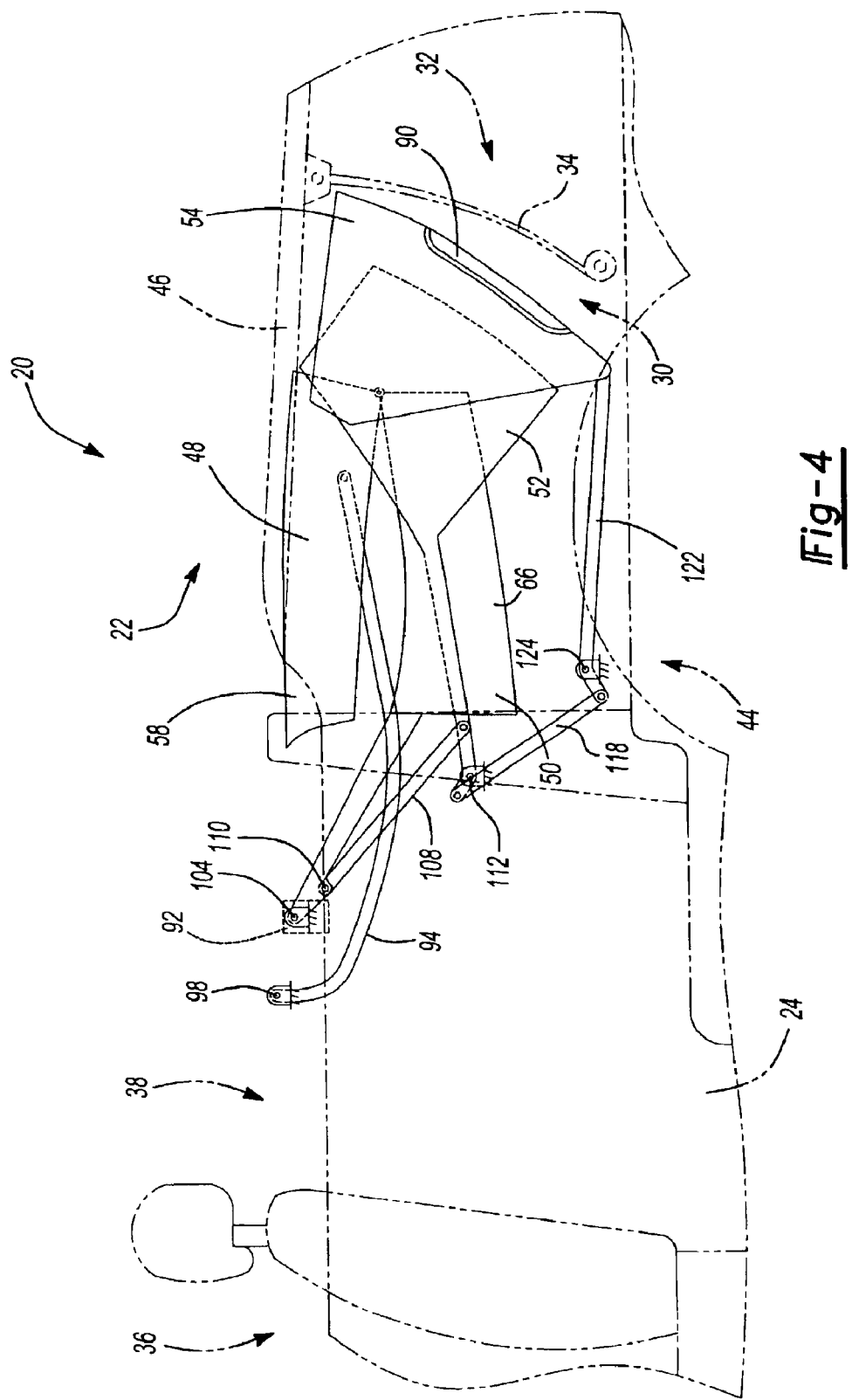
FIG. 4 is a partial side elevation view of the vehicle of FIG. 2 with the hardtop convertible roof in a stowed position.
Figure 5:
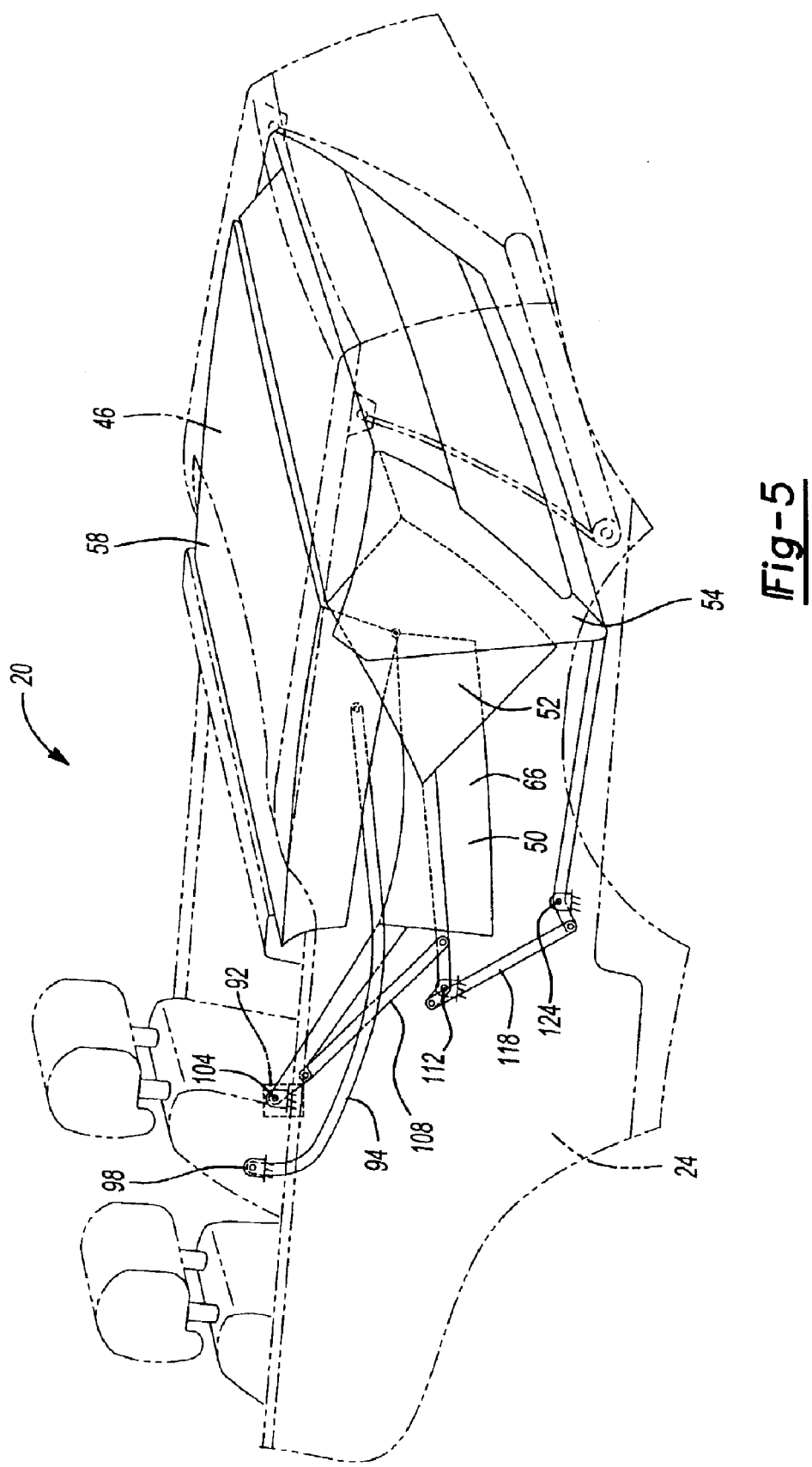
FIG. 5 is a partial perspective view of the vehicle of FIG. 1 with the hardtop convertible roof in the stowed position.

In operation, convertible roof 22 is moved from the raised position depicted in FIGS. 1 and 2 through intermediate positions such as the one depicted in FIG. 3, to the stowed position depicted in FIGS. 4 and 5 by first unlatching first roof section 48 from header 42. An operator engages a switch (not shown) located in passenger compartment 26. The switch is connected electrically to actuator 92 to control the operation of convertible roof 22. When convertible roof 22 is used in conjunction with a manually operated trunk lid, a simple switch may be implemented without the need for sophisticated electronic controls, proximity switches and/or sensors. However, the convertible roof of the present invention may be operated in conjunction with a power operated trunk lid as previously discussed. In this case, the switch is connected electrically to an electronic control unit (not shown) such as a microprocessor, that controls the operation of convertible roof 22. The electronic control unit sends a signal to operate actuator 92 and an actuator coupled to trunk lid 46. Devices such as limit switches, sensors and/or potentiometers are coupled to body 24, trunk lid 46 and convertible roof 22 to inform the electronic control unit of the position of the trunk lid 46 and convertible roof 22 to assure that convertible roof 22 does not interfere with trunk lid 46 during movement between the stowed and raised positions. An example of a suitable control system for convertible roof 22 and/or trunk lid 46 is that disclosed in U.S. Pat. No. 6,288,511 entitled "Automotive Convertible Top System" issued to Porter et al. and assigned to the assignee of the present invention, the disclosure of which is incorporated by reference herein.

Actuator 92 is pivotally coupled to and powered to drive second roof section 50 about fixed pivot 104 to move convertible roof 22 between the raised and stowed positions. As second roof section 50 articulates, force is transferred through second roof section 50 to first roof section 48 via pivot 100. The force produced is sufficient to cause first roof section 48 and second roof section 50 to move. As depicted in FIG. 3, first roof section 48 pivots relative to second roof section 50 in a clamshell manner such that inner surface 60 of first roof section 48 approaches inner surface 68 of second roof section 50. Thus, when moving from the raised to the stowed position, second roof section 50 rotates rearwardly or clockwise about fixed pivot 104 and first roof section 48 rotates counterclockwise relative to second roof section 50 about pivot 100.

As second roof section 50 articulates about fixed pivot 104, force is transferred through first control link 108 to third roof section 52. The force produced is sufficient to cause third roof section 52 to rotate rearwardly or clockwise about fixed pivot 112. As third roof section 52 articulates about fixed pivot 112, force is transferred through second control link 118 to fourth roof section 54. The force produced is sufficient to cause fourth roof section 54 to rotate rearwardly or clockwise about fixed pivot 124. As depicted in FIGS. 3 and 4, third and fourth roof sections 52 and 54 pivot about respective pivots 112 and 124 and are nested together as convertible roof 22 moves from the raised to the stowed position. Also as shown in FIG. 4, movement of convertible roof 22 from the raised to the stowed position causes fourth roof panel 54 to rotate rearwardly or clockwise about fixed pivot 124 less than 90°. Once convertible roof 22 is fully retracted, trunk lid 46 can be moved to its closed position, as shown in FIGS. 5 and 6.

With reference to FIGS. 4 and 5, convertible roof 22 is shown in the stowed position. In the stowed position, first and second roof sections 48 and 50 are each positioned in a substantially horizontal manner within stowage compartment 30. First and second roof sections 48 and 50 are positioned so that inner surface 60 of first roof section 48 faces inner surface 68 of second roof section 50. In this position, first roof section 48 covers a portion of second roof section 50 to provide an aesthetically pleasing appearance. Furthermore, first roof section 48 is positioned so that outer surface 58 faces outwardly from stowage compartment 30. A portion of outer surface 58 of first roof section 48 is positioned beneath trunk lid 46 while a different portion of outer surface 58 of first roof section 48 is exposed and visible from outside the vehicle. Outer surface 58 and trunk lid 46 are generally flush in order to provide an aesthetically pleasing appearance.

In the stowed position, fourth roof section 54 is recessed within stowage compartment 30 such that a portion of fourth roof section 54 is positioned below the top of rear wheel housings 44. Fourth roof section 54 rotates less than 90° when traveling between the raised position and the stowed position. Third and fourth roof sections 52 and 54 are each positioned in a nesting arrangement such that outer surface 74 of third roof section 52 faces inner surface 84 of fourth roof section 54 and are in close proximity to one another. This packaging arrangement of convertible roof 22 avoids the obstruction caused by rear wheel housings 44 and minimizes the packaging envelope. Additionally, convertible roof 20 accomplishes movement between raised and stowed positions and the compact packaging with a simple arrangement of links and through the use of three of the roof sections being directly connected to fixed pivots on body 24 of vehicle 20.

As shown in FIGS. 4 and 5, convertible roof 22 is packaged within stowage compartment 30 separate from miscellaneous storage compartment 32. A deck lid (not shown) is coupled to body 24 to allow access to miscellaneous storage compartment 32 without accessing stowage compartment 30. Therefore, convertible roof 22 does not obstruct access to miscellaneous storage compartment 32 while positioned in either the raised or stowed position.

To move convertible roof 22 from the stowed position to the raised position, trunk lid 46 is moved to its open position and actuator 92 is operated to cause second roof section 50 to rotate clockwise about pivot 104. The articulation of second roof section 50 clockwise about fixed pivot 104 then transmits force to the other roof sections and causes convertible roof 22 to move from the retracted position to the stowed position.

While it is apparent that the embodiments on the invention disclosed are well calculated to provide the advantages and features above stated, it will be appreciated that the invention is susceptible to modification, variation and change without departing from the proper scope or fair meaning of the subsequent claims. For example, the convertible roof may include extra roof sections or additional members or linkages. A soft top roof may also be used with the present device although various advantages of the present invention may not be achieved. While the system was described to include hydraulic actuators, an electric motor or other suitable automatically powered transfer mechanism may alternately be employed to deploy convertible roof 22. Additionally, actuator 92 could include the use of a simple four-bar linkage arrangement to provide a mechanical advantage and desired rate of articulation of second roof section 50 about fixed pivot 104. Furthermore, the convertible roof can alternately be stored in a storage or trunk area of a conventional sedan or coupe that is not partitioned. Other materials and dimensions can be substituted for those disclosed. It is intended by the following claims to cover these and any other departures from the disclosed embodiment which fall within the true spirit of this invention.

What is claimed is:

1. A convertible roof for a vehicle, the convertible roof comprising:
   at least three substantially rigid roof panels each movable from a raised position to a stowed position, each of said panels moving relative to one another when moved from said raised position to said stowed position;
   a first fixed pivot directly connected to a first of said panels and about which said first panel rotates when moving between said raised and stowed positions; and
   a second fixed pivot directly connected to a second of said panels and about which said second panel rotates when moving between said raised and stowed positions,
   wherein movement of said first and second panels is respectively limited to rotation about said first and second fixed pivots.

2. The convertible roof of claim 1, wherein three of said panels are each directly connected to a respective fixed pivot and rotate about said fixed pivot when moving between said raised and stowed positions.

3. The convertible roof of claim 1, wherein at least one of said panels is substantially horizontal when in said stowed position.

4. The convertible roof of claim 1, wherein at least two of said panels are nested together when in said stowed position.

5. The convertible roof of claim 1, further comprising a vertical roller shade operable between first and second positions.

6. A convertible roof for a vehicle, the convertible roof comprising:
   at least three substantially rigid roof panels each movable from a raised position to a stowed position;
   a first fixed pivot directly connected to a first of said panels and about which said first panel rotates when moving between said raised and stowed positions;
   a second fixed pivot directly connected to a second of said panels and about which said second panel rotates when moving between said raised and stowed positions; and
   a trunk lid operable between first and second positions to allow said roof panels to move between said raised and stowed position, said trunk lid when in said first position covering a portion of said roof panels when in said stowed position, and wherein a portion of an exterior surface of one of said roof panels when in said stowed position is visible and substantially flush with said trunk lid when in said first position.

7. The convertible roof of claim 1, wherein said roof panels are at least four roof panels.

8. A convertible roof for a vehicle, the convertible roof comprising:
   at least three substantially rigid roof panels each movable from a raised position to a stowed position;
   a first fixed pivot directly connected to a first of said panels and about which said first panel rotates when moving between said raised and stowed positions; and
   a second fixed pivot directly connected to a second of said panels and about which said second panel rotates when moving between said raised and stowed positions,
   wherein each of said panels has an interior surface and an exterior surface, a forwardmost two of said panels folding in a clamshell manner with said interior surfaces of said forwardmost two panels facing when in said stowed position, and a third panel of said at least three panels folding in a non-clamshell manner.

9. A convertible roof for a vehicle, the convertible roof comprising:
at least three substantially rigid roof panels each movable from a raised position to a stowed position;
a fixed pivot located inboard of vertical fore-aft planes defined by insides of rear wheel housings on the vehicle; and
at least one of said panels is connected to said fixed pivot and rotates about said fixed pivot when moving between said raised and stowed positions.

10. The convertible roof of claim 9, wherein said one panel is a rearmost panel that is directly connected to said fixed pivot.

11. The convertible roof of claim 9, where said fixed pivot is located below a horizontal fore-aft plane defined by tops of said wheel housings.

12. The convertible roof of claim 9, wherein at least one of said panels is substantially horizontal when in said stowed position.

13. The convertible roof of claim 9, wherein said fixed pivot is a first fixed pivot and further comprising a second fixed pivot, and two of said panels are each directly connected to one of said first and second fixed pivots and rotate about said fixed pivot when moving between said raised and stowed positions.

14. The convertible roof of claim 9, wherein at least two of said panels are nested together when in said stowed position.

15. The convertible roof of claim 9, wherein one of said panels has an elongated arm that extends from said panel and said arm is connected to said fixed pivot.

16. A convertible roof for a vehicle, the convertible roof comprising:
at least three substantially rigid roof sections movable from a raised position to a stowed position different than said raised position;
wherein a rearmost one of said roof sections is directly connected to a fixed pivot and is limited to rearward rotation about said fixed pivot less than about 90 degrees when moving from said raised to said stowed position.

17. The convertible roof of claim 16, wherein a rearmost two of said roof sections rotate rearwardly when moving from said raised to said stowed position.

18. The convertible roof of claim 17, wherein a rearmost three of said roof sections rotate rearwardly when moving from said raised to said stowed position.

19. The convertible roof of claim 16, wherein said at least three roof sections are at least four roof sections.

20. A convertible roof for a vehicle, the convertible roof comprising:
at least three substantially rigid roof sections movable from a raised position to a stowed position;
wherein a rearmost of said roof sections is directly connected to a fixed pivot and rotates rearwardly about said fixed pivot less than about 90 degrees when moving from said raised to said stowed position;
wherein a forwardmost two of said roof sections are pivotally connected together and inner surfaces of said forward most two roof sections face one another when said convertible roof is in said stowed position.

21. The convertible roof of claim 16, further including a balance link having a first end pivotally coupled to a forward most roof section and a second end adapted to pivotally mount to the vehicle.

22. The convertible roof of claim 16, wherein said rearmost roof section includes a three-dimensionally curved window.

23. The convertible roof of claim 16, wherein two of said roof sections are nested together when in said stowed position.

24. The convertible roof of claim 16, wherein two of said roof sections are each directly connected to respective fixed pivots and rotate about said fixed pivots when moving between said raised and stowed positions.

25. The convertible roof of claim 16, wherein each roof section of a rearmost three of said roof sections is directly connected to a fixed pivot and rotates about said fixed pivot when moving between said raised and stowed positions.

26. The convertible roof of claim 16, wherein an exterior surface of a forwardmost of said roof sections faces upward when in said stowed position and said forwardmost roof section covers a portion of at least one other roof section when in said stowed position.

27. The convertible roof of claim 16, wherein a forwardmost two of said roof sections are substantially horizontal when in said stowed position.

28. The convertible roof of claim 16, wherein said roof sections are stowed behind a passenger seating area in the vehicle when in the stowed position.

29. A convertible roof for a vehicle, the convertible roof comprising:
at least four hardtop roof sections moveable from a raised position to a stowed position, each of said panels moving relative to one another when moved from said raised position to said stowed position;
wherein at least two of said roof sections have elongated arms fixedly extending from and always moving with said roof sections, and each of said arms is directly connected to a fixed pivot and each of said arms and associated roof sections rotate about an associated fixed pivot when moving between said raised and stowed positions.

30. The convertible roof of claim 29, wherein at least two of said roof sections are directly connected to fixed pivots and each rotates about one of said fixed pivots when moving between said raised and stowed positions.

31. The convertible roof of claim 30, wherein at least three of said roof sections are directly connected to fixed pivots and each rotates about one of said fixed pivots when moving between said raised and stowed positions.

32. The convertible roof of claim 29, wherein at least one roof section is substantially horizontal when in said stowed position.

33. The convertible roof of claim 32, wherein at least two roof sections are substantially horizontal when in said stowed position.

34. The convertible roof of claim 29, wherein at least two roof sections are coupled together by an at feast four-bar linkage assembly.

35. The convertible roof of claim 29, wherein at least two roof sections are coupled together by an at least six-bar linkage assembly.

36. A convertible roof for a vehicle, the convertible roof comprising:
at least four hardtop roof sections moveable from a raised position to a stowed position,
wherein at least one of said roof sections has an elongated arm fixedly extending from and always moving with said roof section, and said arm is directly connected to a fixed pivot and said arm and roof section rotate about said fixed pivot when moving between said raised and stowed positions, and wherein each pair of at least two pairs of roof sections are coupled together by an at least four-bar linkage assembly.

37. The convertible roof of claim 36, wherein each pair of at least three pairs of roof sections are coupled together by an at least four-bar linkage assembly.

38. A convertible roof for a vehicle, the convertible roof comprising:

at least four hardtop roof sections moveable from a raised position to a stowed position, wherein at least one of said roof sections has an elongated arm fixedly extending from and always moving with said roof section, and said arm is directly connected to a fixed pivot and said arm and roof section rotate about said fixed pivot when moving between said raised and stowed positions, and wherein said fixed pivot is above a beltline of the vehicle.

39. The convertible roof of claim 29, wherein one of said roof sections is substantially horizontal when in said stowed position and covers a portion of at least one other roof section when in said stowed position.

40. The convertible roof of claim 29, wherein two roof sections are pivotally connected together.

41. The convertible roof of claim 29, wherein at least two roof sections are nested together when in said stowed position.

42. The convertible roof of claim 29, wherein said fixed pivot is located between a pair of vertical fore-aft planes defined by insides of a pair of rear wheel housings on the vehicle.

43. The convertible roof of claim 29, further including at least four fixed pivots on opposite sides of the vehicle and wherein said roof sections are coupled to said at least four fixed pivots on said opposite sides of the vehicle.

44. The convertible roof of claim 29, wherein said at least one roof section is an intermediate roof section.

45. A convertible roof for a vehicle, the convertible roof comprising:

at least four hardtop roof sections moveable from a raised position to a stowed positions, wherein at least one of said roof sections has an elongated arm fixedly extending from and always moving with said roof section, and said arm is directly connected to a fixed pivot and said arm and roof section rotate about said fixed pivot when moving between said raised and stowed positions, and further including a balance link having a first end pivotally connected to a forward most roof section and a second end pivotally connected to a fixed pivot.

46. The convertible roof of claim 29, wherein said roof sections are coupled together by an at least eight-bar linkage assembly.

47. A convertible roof for a vehicle, the convertible roof comprising:

at least four substantially rigid roof panels each moveable from a raised position to a stowed position; and a cover operable between first and second positions to allow said roof panels to move between said raised and stowed position, said cover when in said first position covering a portion of said roof panels when in said stowed position, and said cover when in said second position allowing movement of said roof panels between said raised and stowed positions.

48. The convertible roof of claim 47, wherein a portion of an exterior surface of one of said roof panels when in said stowed position is visible and substantially flush with said cover when in said first position.

49. The convertible roof of claim 47, further comprising:

a first pivot directly connected to a first of said panels and about which said first panel rotates when moving between said raised and stowed positions; and a second pivot directly connected to a second of said panels and about which said second panel rotates when moving between said raised and stowed positions.

\* \* \* \* \*

UNITED STATES PATENT AND TRADEMARK OFFICE
CERTIFICATE OF CORRECTION

PATENT NO. : 7,014,247 B2  Page 1 of 1
APPLICATION NO. : 10/378337
DATED : March 21, 2006
INVENTOR(S) : Christopher J. Dilluvio It is certified that error appears in the above-identified patent and that said Letters Patent is hereby corrected as shown below:

TITLE PAGE, No. (56) References Cited, U.S. Patent Documents, Page 2, column 1, reference No. 54, "Füurst et al." should be --Fürst et al.--.

TITLE PAGE, No. (56) References Cited, Other documents, Page 3, column 2, reference No. 21, "Hudson Super Xix" should be --Hudson Super Six--.

Column 3, line 49, after first occurrence of "34", insert --is--.

Column 11, line 64, Claim 20, "forward most" should be --forwardmost--.

Columns 11-12, lines 67-1, Claim 21, "forward most" should be --forwardmost--.

Column 12, line 56, Claim 34, "feast" should be --least--.

Column 14, line 4, Claim 45, "positions" should be --position--.

Column 14, line 12, Claim 45, "forward most" should be --forwardmost--.

Signed and Sealed this

Twenty-second Day of August, 2006

JON W. DUDAS
*Director of the United States Patent and Trademark Office*